(12) United States Patent
Yotsumoto et al.

(10) Patent No.: US 7,603,686 B2
(45) Date of Patent: Oct. 13, 2009

(54) INFORMATION PROCESSING METHOD AND APPARATUS AND RECORDING MEDIUM

(75) Inventors: Natsuko Yotsumoto, Tokyo (JP); Masahiro Asai, Kanagawa (JP); Mami Uchida, Saitama (JP); Takaaki Miura, Tokushima (JP); Katsuhisa Takata, Tokushima (JP)

(73) Assignees: Sony Corporation, Tokyo (JP); Justsystem Corporation, Tokushima (JP)

( * ) Notice: Subject to any disclaimer, the term of this patent is extended or adjusted under 35 U.S.C. 154(b) by 1099 days.

(21) Appl. No.: 09/996,519

(22) Filed: Nov. 29, 2001

(65) Prior Publication Data

US 2002/0088006 A1 Jul. 4, 2002

(30) Foreign Application Priority Data

Nov. 30, 2000 (JP) ............................ 2000-365606

(51) Int. Cl.
*H04N 5/445* (2006.01)
(52) U.S. Cl. .................... 725/48; 725/35; 725/51; 725/105; 725/109; 725/131; 725/46; 725/36
(58) Field of Classification Search ............. 725/46, 725/48, 105, 109, 35, 51, 131, 36
See application file for complete search history.

(56) References Cited

U.S. PATENT DOCUMENTS

| | | | |
|---|---|---|---|
| 5,586,121 A * | 12/1996 | Moura et al. ................ 370/404 |
| 5,983,246 A | 11/1999 | Takano | |
| 6,175,741 B1 * | 1/2001 | Alperovich ................. 455/458 |
| 6,263,505 B1 * | 7/2001 | Walker et al. ................ 725/110 |
| 6,388,714 B1 * | 5/2002 | Schein et al. ................ 348/563 |
| 6,462,778 B1 * | 10/2002 | Abram et al. ................ 348/239 |
| 6,721,536 B1 * | 4/2004 | Shimazu .................... 455/3.02 |
| 7,013,478 B1 * | 3/2006 | Hendricks et al. ............. 725/46 |
| 7,017,175 B2 * | 3/2006 | Alao et al. .................. 725/105 |
| 2001/0022630 A1 | 9/2001 | Nakagawa et al. | |
| 2006/0015906 A1 * | 1/2006 | Boyer et al. .................. 725/51 |

FOREIGN PATENT DOCUMENTS

| | | |
|---|---|---|
| EP | 0 309 627 | 4/1989 |
| EP | 0 462 718 | 12/1991 |
| WO | WO 00 28436 | 5/2000 |

\* cited by examiner

*Primary Examiner*—John W Miller
*Assistant Examiner*—Sumaiya A Chowdhury
(74) *Attorney, Agent, or Firm*—Frommer Lawrence & Haug LLP; William S. Frommer; Thomas F. Presson

(57) ABSTRACT

An information processing apparatus in which television channel setting processing and provider setting processing can be completed expeditiously. The information processing apparatus has the function of connecting to the Internet and the function of receiving television broadcast from the broadcasting stations. If, when the broadcast territory of using the information processing apparatus is set and registered, and the Internet service provider is to be set, the Internet service providers are demonstrated in the display unit of the information processing apparatus beginning from those geographically closest to the user's territory.

5 Claims, 7 Drawing Sheets

23 WARDS
MUSASHINO-SHI
MITAKA-SHI
KODAIRA-SHI
TANASHI-SHI
HOYA-SHI
HIGASHI-KURUME-SHI
⋮

ACCESS POINT LIST

| POINT NAMES | ADDRESSES | |
|---|---|---|
| A B C D | 03-1111-1111 | ☐ |
| B C D E | 03-2222-2222 | ☐ |
| C D E F | 03-3333-3333 | ☐ 73 |
| D E F G | 03-4444-4444 | ☐ |
| ⋮ | ⋮ | |

INFORMATION PROCESSING METHOD AND APPARATUS AND RECORDING MEDIUM

BACKGROUND OF THE INVENTION

1. Field of the Invention

This invention relates to an information processing method and apparatus and a recording medium. More particularly, it relates to an information processing method and apparatus and a recording medium, which are configured for simplifying the processing for registration of preset information prior to use of the apparatus should such processing operation prior to use of the apparatus be required.

2. Description of Related Art

A user who purchased a television receiver has to register a broadcasting territory of using the television receiver (the territory in which the user resides) prior to start of use. The television receiver undertakes the processing of setting the receiving channels based on this registration.

On the other hand, if the user who purchased a television receiver is desirous to use the Internet to access a preset server, the or she has to set the Internet provider in the personal computer at the outset.

Thus, if a user purchased an information processing apparatus having both the function of receiving television broadcast and the function of accessing various servers over the Internet, the or she has to perform the processing of setting the broadcast territory for setting the receiving channels and the processing of registering the Internet provider. These processing operations are, however, extremely time-consuming.

SUMMARY OF THE INVENTION

It is therefore an object of the present invention to provide an information processing method and apparatus and a recording medium whereby the processing for registration can be completed promptly.

In one aspect, the present invention provides an information processing apparatus including first acquisition means for acquiring the first information, first registration means for registering the first subsidiary information required for acquiring the first information, second acquisition means for acquiring the second information, second registration means for registering the second subsidiary information required for acquiring the second information and verifying means for verifying whether or not the first subsidiary information or the second subsidiary information has already been registered. The first registration means or the second registration means uses, if one of the first subsidiary information and the second subsidiary information is already registered, the one subsidiary information already registered for registration of the other subsidiary information.

The first acquisition means acquires the contents of the television broadcast as the first information. The second acquisition means acquires web contents as the second information from a server over the Internet.

The subsidiary information is the information pertinent to the broadcast territories for setting the reception channel in the television broadcast. The second subsidiary information is the information pertinent to a provider for connection to the Internet.

In another aspect, the present invention provides an information processing method including a first acquisition step of acquiring the first information, a first registration step of registering the first subsidiary information required for acquiring the first information, a second acquisition step of acquiring the second information, a second registration step of registering the second subsidiary information required for acquiring the second information, and a verifying step of verifying whether or not the first subsidiary information or the second subsidiary information has already been registered. The first registration step or the second registration step uses, if one of the first subsidiary information and the second subsidiary information is already registered, the one subsidiary information already registered for registration of the other subsidiary information.

In yet another aspect, the present invention provides a recording medium having recorded thereon a computer-readable program, in which the computer-readable program includes a first acquisition step of acquiring the first information, a first registration step of registering the first subsidiary information required for acquiring the first information, a second acquisition step of acquiring the second information, a second registration step of registering the second subsidiary information required for acquiring the second information, a verifying step of verifying whether or not the first subsidiary information or the second subsidiary information has already been registered. The first registration step or the second registration step uses, if one of the first subsidiary information and the second subsidiary information is already registered, the one subsidiary information already registered for registration of the other subsidiary information.

In the information processing method and apparatus and the recording medium, according to the present invention, if one of the first subsidiary information and the second subsidiary information is already registered, the one subsidiary information already registered is used for registration of the other subsidiary information, with the result that the registration processing can be completed expeditiously, thereby improving the user interface.

DESCRIPTION OF THE PREFERRED EMBODIMENTS

Figure 1:
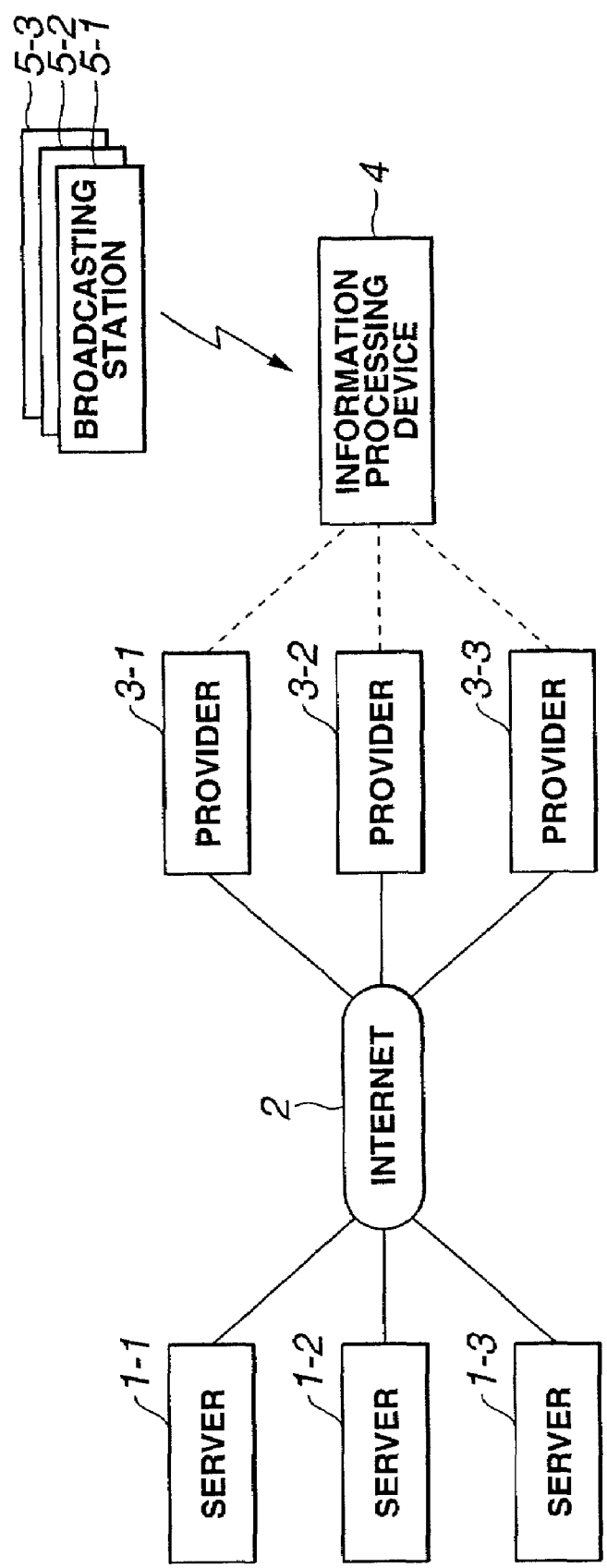
FIG. 1 shows the structure of a system to which the information processing apparatus of the present invention is applied.

FIG. 1 shows the structure of a network system employing an information processing apparatus according to the present invention.

That is, an information processing apparatus 4 has the function not only of receiving television broadcast from broadcasting stations 5-1 to 5-3 and the function of connecting to the Internet 2 through one of Internet service providers 3-1 to 3-3 which has been set and registered from the outset. The Internet service providers are sometimes abbreviated to providers. So, the user of the information processing apparatus 4 is able not only to view television programs aired by the broadcasting stations 5-1 to 5-3, but to access servers 1-1 to 1-3 connected to the Internet 2 to receive preset web contents.

Figure 2:
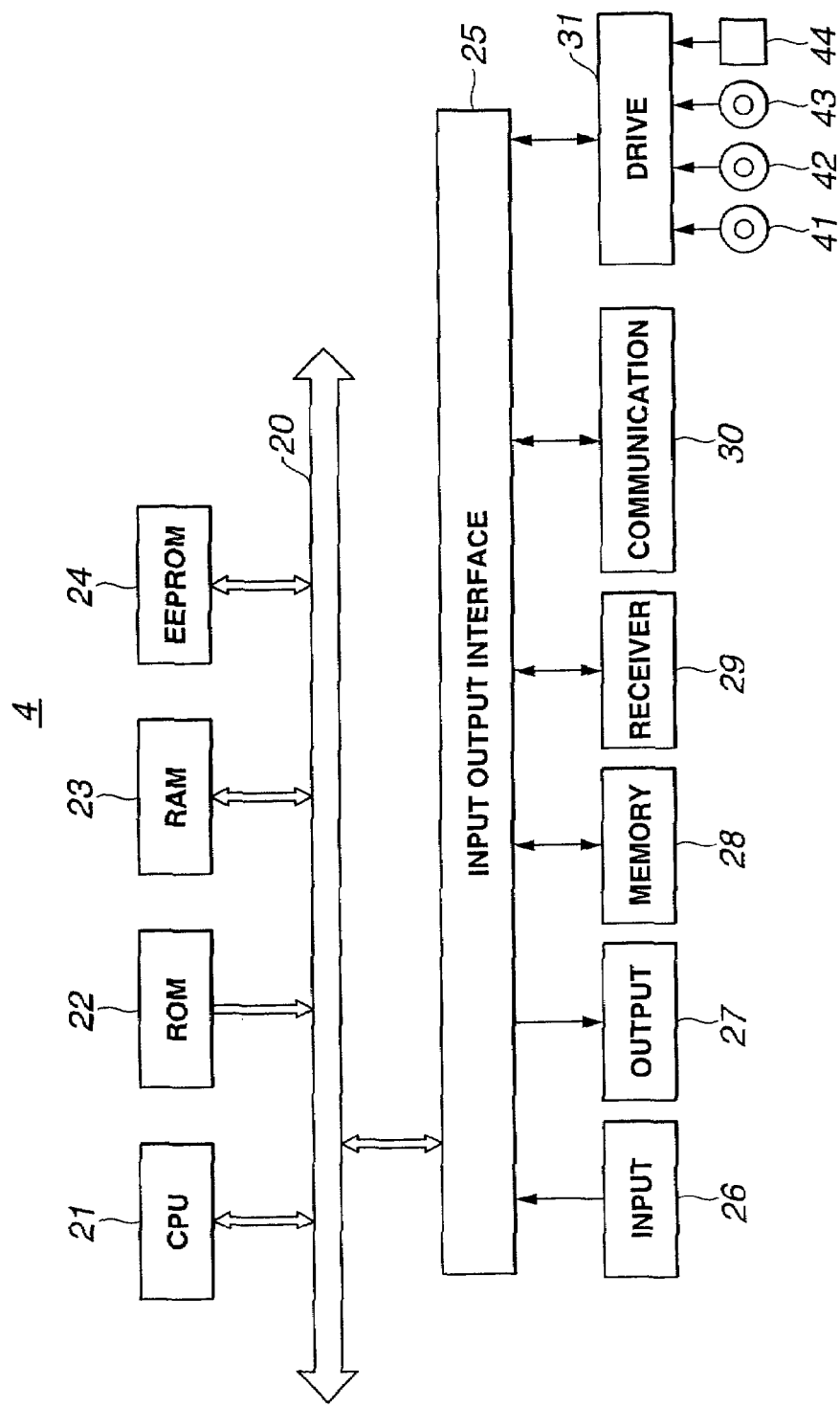
FIG. 2 is a block diagram showing an illustrative structure of the information processing apparatus shown in FIG. 1.

FIG. 2 shows an illustrative structure of an information processing terminal 4. A CPU 21 executes various processing operations in accordance with a program stored in a ROM (read-only memory) 22 or a program loaded on a RAM (random-access memory) 23. There is also optionally stored data necessary for the CPU 21 to execute various processing operations. There is stored in the EEPROM 24 the information required to be held even after power down.

Figure 3:
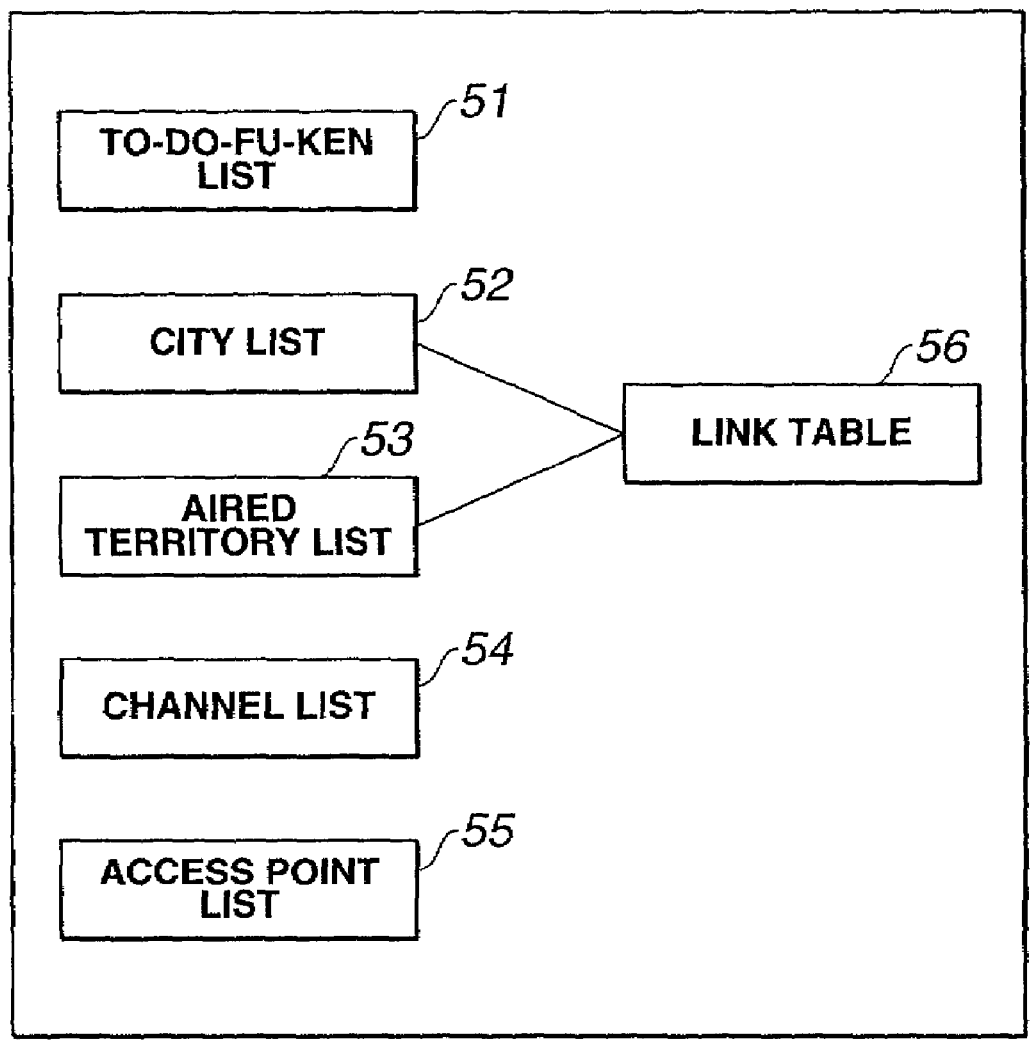
FIG. 3 illustrates the information stored in an EEPROM of FIG. 1.

FIG. 3 shows an instance of the information stored in the EEPROM 24. In the present embodiment, a to-do-fu-ken list 51 (list of names of administrative districts), a city list 52, a broadcast territory list 53, a channel list 54, an access point list 55 and a link table 56, are stored. In the to-do-fu-ken list 51, there is registered a list of to, do, fu and ken in which resides the user employing the information processing apparatus 4. In the city list 52, there are stored the city in which resides the user. In the broadcast territory list 53, there are stored broadcast territories necessary in setting reception channels of the television broadcast. In the channel list 54, there is registered a list of broadcast channels that can be received by the viewer in each broadcast territory. In the access point list 55, there is registered a list of providers. In the link table 56, there are stored the correspondence relationships between the cities stored in the city list 52 and the broadcast territories stored in the broadcast territory list 53.

The CPU 21, ROM 22 and the RAM 23 are interconnected over a bus 20, to which is also connected an input output interface 25.

To the input output interface 25 are connected an input unit 26, comprised e.g., of a keyboard, a mouse, a switch, a button and a remote commander, a display comprised e.g., of a CRT or a LCD, an output unit 27 comprised e.g., of a loudspeaker, a storage unit 28, comprised e.g., of a hard disc, a receiving unit 29 for receiving and demodulating electrical waves from the broadcasting stations 5-1 to 5-3 and a communication unit 30 comprised of a modem and a terminal adapter. The communication unit 30 takes charge of communication processing over the Internet 2.

To the input output interface 25, there is also connected a drive 31 as necessary. On the drive 31 are mounted a magnetic disc 41, an optical disc 42, a magneto-optical disc 43 or a semiconductor memory 44, from which a computer program is read out and installed on the storage unit 28 as necessary.

When viewing the television broadcast using the information processing apparatus 4, the user who purchased the information processing apparatus 4 has to execute at the outset the processing of setting the television channel to be received. Referring to the flowchart of FIG. 4, the processing of setting the television channel is explained. This processing is executed by the CPU 21 when the user acts on the input unit 26 to command the processing of setting the reception channel of television broadcast.

First, at step S1, the CPU 21 verifies whether or not a city has already been registered in the EEPROM 24. That is, if the user already completed the processing of setting the access point as later explained with reference to FIG. 7, the city in which the user is residing (the city in which the information processing apparatus 4 is used) has already been registered in the EEPROM 4 by the processing of step S30. If it is verified at step S1 that the city has not been registered, the program then moves to step S2 where the to-do-fu-ken list 51 registered in the EEPROM 24 is read out and sent to the output unit 27 for display.

Figure 5:
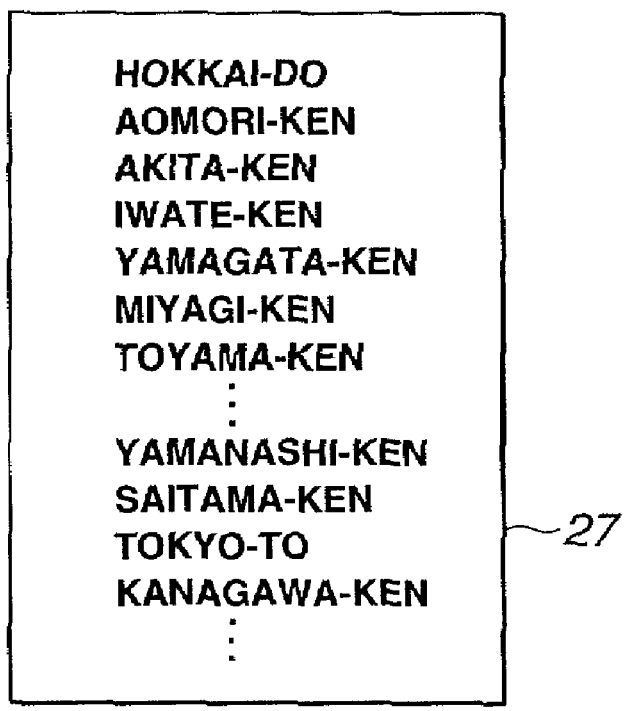
FIG. 5 shows an instance of display of a to-do-fu-ken list.

FIG. 5 shows an instance of display on the display part of the output unit 27. In the present instance, the names of the to-do-fu-ken, such Hokkai-do, Aomori-ken, Akita-ken or Iwate-ken, are displayed in a sequence from north to south. The display order may also be in the katakana-order (a-i-u-e-o order).

The user acts on the input unit 26 to select the to-do-fu-ken in which the user resides, that is in which the information processing apparatus 4 is used. If this selection is made by the user, the CPU 21 acquires data of to-do-fu-ken as selected at step S3.

At step S4, the CPU 21 reads out the broadcast territory list 53 stored in the EEPROM 24 to output the read-out data at the output unit 27 for display.

Figure 6:
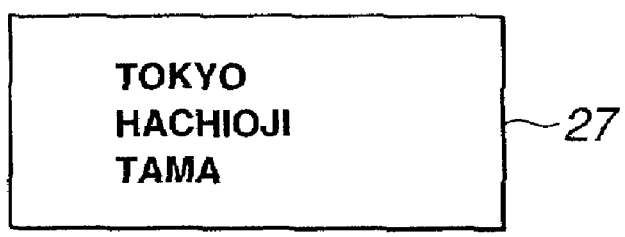
FIG. 6 shows an instance of display of a broadcast territory.

FIG. 6 shows an instance of display in this case. In the present instance, three broadcast territories, that is Tokyo, Hachioji and Tama, are displayed. It is because reception channels of the television broadcast in [Tokyo] differs in these three broadcast territories. The user acts on the input unit 26 to check to which of these three broadcast territories belongs the territory in which the or she resides. The user accordingly selects one such broadcast territory. If the broadcast territory is selected, the CPU 21 at step S5 acquires data of the so selected broadcast territory.

The program then moves to step S7 where the CPU 21 selects the reception channels of the television broadcast for the broadcast territory as acquired at step S5, and sets the reception channel for reception in the receiving unit 29.

At step S8, the CPU 21 registers the broadcast territory acquired at step S5 in the EEPROM 24 as a broadcast territory in which to use the information processing apparatus 4.

If the broadcast territory is set in this manner, it is utilized in the access point setting processing as later explained with reference to the flowchart of FIG. 7 (step S26).

If it is verified at step S1 that a city has already been registered in the EEPROM 24, the program moves to step S6 where the CPU 21 reads out the broadcast territory corresponding to the registered city from the EEPROM 24. That is, the correspondence relationships between the broadcast territories registered in the broadcast territory list 53 and the cities registered in the city list 52 are registered in a link table 56 of the EEPROM 24. The CPU 21 reads out the broadcast territories associated with the cities already registered by referencing the link table 56. For example, if Shinjuku-ku is registered as a city, the Shinjuku-ku belongs to [Tokyo-to]. Moreover, since there are three broadcast territories [Tokyo], [Hachioji] and [Tama] in [Tokyo-to] and Shinjuku-ku belongs to [Tokyo], the CPU 21 reads out the broadcast territory [Tokyo] from the broadcast territory list 53.

The program then moves to step S7 where the CPU 21 executes the setting processing for the reception channels so that the television program aired in the territory read out at step S6 can be received by the receiving unit 29. At step S8, the broadcast territory, here [Tokyo], is registered in the EEPROM 24.

Figure 4:
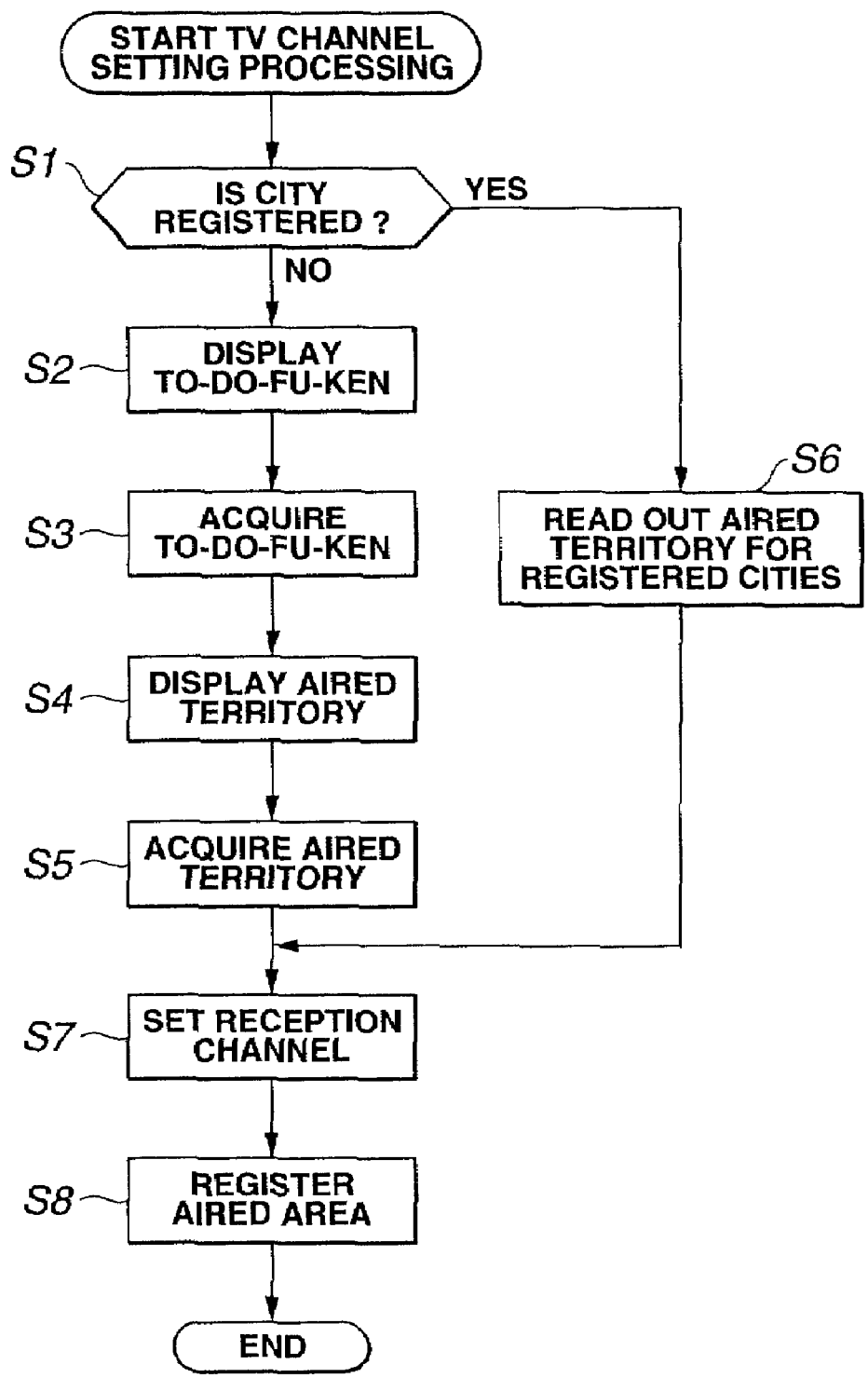
FIG. 4 is a flowchart for illustrating the television channel setting processing of the information processing apparatus of FIG. 2.

Thus, in the processing of FIG. 4, if a city has already been registered by the access point setting processing shown in the flowchart of FIG. 7 as later explained, the user is not required to select and specify the to-do-fu-ken and the broadcast area for television channel setting processing, thus improving tractability.

If, when there is not necessarily a one-for-one correspondence between the broadcast territories and cities, the broadcast territories are read out at step S6, the CPU 21 may also proceed to step S4 to display the broadcast territories, so that the user may select a preset one from among these territories.

Figure 7:
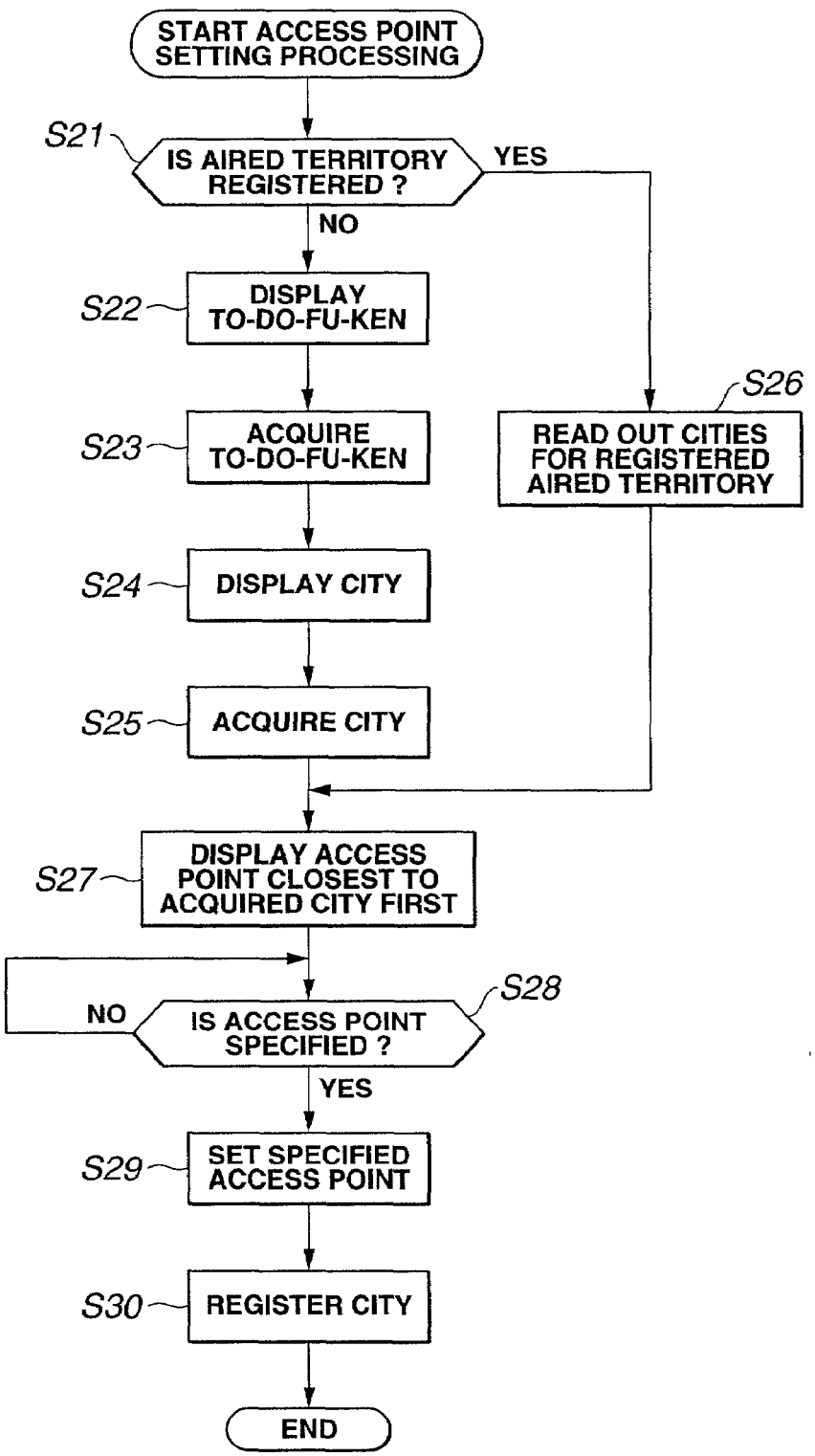
FIG. 7 is a flowchart for illustrating the access point setting processing of the information processing apparatus of FIG. 2.

Referring to the flowchart of FIG. 7, the provider registration processing for connection to the Internet 2, that is access point setting processing, is explained. This processing is executed by the CPU 21 when the user acts on the input unit 26 to command the setting of the access point.

First, at step S21, the CPU 21 verifies whether or not the broadcast territories are already been registered in the EEPROM 24. If no broadcast territories are registered, the program moves to step S22 where the CPU 21 reads out the to-do-fu-ken list 51 of the EEPROM 24 to output the list to the output unit 27 to display the names of the to-do-fu-ken. This displays the names of the to-do-fu-ken, shown in FIG. 5, in the same way as described above.

Figures 8, 9:
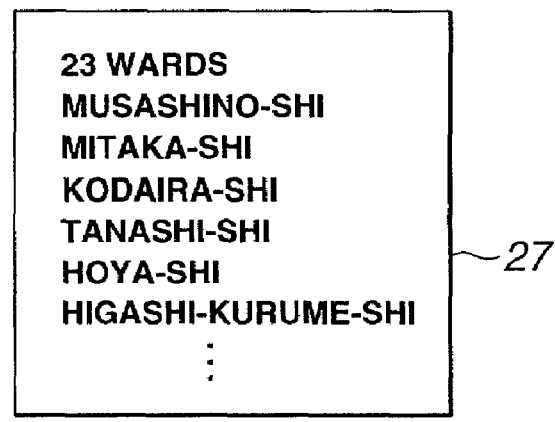
FIG. 8 shows an instance of display of a city list.
FIG. 9 shows an instance of display of an access point list.

The user acts on the input unit 26 to select a preset one of the names of the to-do-fu-ken to specify the territory where the user resides, that is the territory of use of the information processing apparatus 4. If the user has specified the to-do-fu-ken, the CPU 21 at step S23 acquires the data of the specified to-do-fu-ken. At step S24, the CPU 21 reads out the city belonging the to-do-fu-ken from the city list 52 to output and display the read out data at the output unit 27. For example, if [Tokyo-to] is specified as to-do-fu-ken, the cities shown in FIG. 8 are displayed in the output unit 27. In the instance of FIG. 8, [23 wards (ku)], [Musashino-shi], [Mitaka-shi], [Kodaira-shi] and [Tanashi-shi], for example, are displayed.

When the cities are displayed in this manner, the user acts on the input unit 26 to select the city in which the or she resides (the city of use of the information processing apparatus 4). The CPU 21 at step S25 acquires data of the city associated with this operation. At step S27, the CPU 21 reads out the access point list 55 of the EEPROM 24 to output and display the access points (providers) at the output unit 27, beginning from the access point (provider) geometrically closest to the city acquired at step S25.

FIG. 9 shows an instance of display in this case. In this instance, there are shown access points when the user has selected [23 wards] from among the cities shown in FIG. 8. In this instance, since the user is residing in the [23 wards], the telephone numbers of the providers belonging to the [23 wards] are displayed at the leading end of the access point list. More specifically, the providers having the trunk code of [03] for the 23 wards are displayed first and foremost.

The user acts on scroll buttons 71, 72 as necessary to scroll the access points displayed in the output unit 27 to search the desired access point.

When the access points are displayed in this manner, the trunk codes of the telephone numbers are displayed in the order of the increasing code numbers. In many cases, the user selects the provider having the same trunk code as that of the user's territory as a provider, because the telephone charges may be decreased correspondingly. Thus, by arraying the provider(s) of the user's own territory first and foremost, the user is able to retrieve the near-by provider more expeditiously.

If the desired provider is found, the user acts on the input unit 26 to check a check box of the desired provider to specify the provider.

The CPU 21 is at stand-by state until the access point (provider) is specified at step S28. When the access point is specified, the CPU 21 proceeds to step S29 to execute the processing of setting the so specified access point as a provider in case the information processing apparatus 4 connects to the Internet 2 via communication unit 30.

The CPU 21 then proceeds to step S30 to register the city acquired at step S25 as a city of use of the information processing apparatus 4 in the EEPROM 24.

If the access point setting processing is performed in this manner, the city name is registered. Thus, if the television channel setting processing shown in the flowchart of FIG. 4 is executed after the access point setting processing, the processing from step S2 to step S5 is skipped as described above to enable the television channel setting processing to be completed more readily.

If conversely it is verified at step S21 that the broadcasting territory has already been registered in the EEPROM 24, the CPU 21 proceeds to step S26 to read out the city associated with the so registered broadcasting territory by referencing the link table 56. If the user has already completed the television channel setting processing shown in the flowchart of FIG. 4, the broadcast territory is already registered by the processing of step S8. Thus, in such case, the cities associated with the broadcast territory are read out at step S26. For example, if [Tokyo] is registered as the broadcast territory, the cities of the [23 wards] are read out based on the link table 56.

The CPU 21 then proceeds to step S27 to display the access point list beginning from the access point geographically closest to the cities read out at step S26. The access point is set by the processing similar to the processing in the above-described instance and registered.

If the television channel setting processing has already been completed as described above, the processing at steps S22 to S25. of FIG. 7 is skipped. Thus, the user is able to complete the access point setting processing more expeditiously.

If, after completion of the television channel setting processing and the access point setting processing, the user acts on the input unit 26 to command the reception of the television broadcast, the CPU 21 controls the receiving unit 29 to cause the electrical waves of the broadcasting station specified by the user to be received to output the aired contents at the output unit 27. Since the setting processing for the correct broadcast territory is made at this time, the broadcast channels can be received reliably.

If the user 26 acts on the input unit 26 to command the accessing to the server 1, the CPU 21 controls the communication unit 30 to access the server 3-1 from e.g., the provider 3-1 over the Internet 2. The web contents are received from the server 3-1. The web contents are then received from the server 3-1 so as to be issued at the output unit 27.

Although the present invention has been explained taking the instance of acquiring the broadcast contents and the web contents, by way of an example, the present invention can also be applied to the case of acquiring other sorts of the information.

Although the above-described sequence of operations can be performed on a hardware, it may also be executed by the software. If the sequence of operations is to be executed on the software, the program forming the software is installed in a dedicated hardware built in a computer. Alternatively, the program forming the software is installed from a recording medium in e.g., a general-purpose personal computer capable of executing various functions.

As shown in FIG. 2, the recording medium is formed not only by a package medium, such as a magnetic disc 41, inclusive of a floppy disc, an optical disc 42, inclusive of a CD-ROM (Compact Disc-Read-Only memory) and DVD (Digital Versatile Disc), a magneto-optical disc 43, inclusive of MD (Mini-Disc), or a semiconductor memory 34, having the program pre-recorded thereon, but also by a ROM or a hard disc, having the program pre-recorded thereon and which is furnished to the user as it is built in the computer from the outset.

In the present specification, the steps stating the program recorded on the recording medium includes parallel processing or batch-wise processing, in addition to the processing executed chronologically in an explicitly stated sequence.

Meanwhile, the system herein means an entire apparatus comprised of plural component units.

What is claimed is:

1. An information processing apparatus comprising:

first acquisition means for acquiring first information;

first registration means for registering first subsidiary information required for acquiring said first information;

second acquisition means for acquiring second information;

second registration means for registering second subsidiary information required for acquiring said second information, wherein the first acquisition means acquires the first information and the second acquisition means acquires the second information via distinct terminals relating to information content, and wherein third subsidary information, being comprised of at least a portion of the first subsidiary information and at least a portion of the second subsidary information is stored in a memory to be held after power down; and verifying means for verifying whether said first subsidiary information or said second subsidiary information has previously been registered;

wherein said first registration means or said second registration means utilizes, if one of said first subsidiary information or said second subsidiary information is already registered, either the first subsidiary information or the second subsidiary information that has been previously registered for registration of the other subsidiary information, wherein functions of the information processing apparatus comprises a function of receiving a television broadcast from a broadcasting station and a function of connecting to Internet through an Internet service provider, wherein upon registration of the second subsidiary information, a list of telephone numbers is presented to a user in an order of increasing trunk code numbers, a first telephone number of the list having a same trunk code as that of the user's territory;

wherein names of the distinct terminals being closest to where the information procession apparatus is located is first displayed during registration of the first subsidiary information or registration of the second subsidiary information, and wherein correspondence relationships between cities and broadcast territories are stored in a link table.

2. The information processing apparatus according to claim 1 wherein said first acquisition means acquires contents of the television broadcast as said first information;

wherein said second acquisition means acquires web contents as said second information from a server over the Internet.

3. The information processing apparatus according to claim 2 wherein said first subsidiary information is the information pertinent to the broadcast territories for setting a reception channel in said television broadcast; and wherein said second subsidiary information being information pertinent to a provider for connection to said Internet.

4. An information processing method comprising:

a first acquisition step of acquiring first information;

a first registration step of registering first subsidiary information required for acquiring said first information;

a second acquisition step of acquiring second information;

a second registration step of registering second subsidiary information required for acquiring said second information, wherein the first acquisition step acquires the first information and the second acquisition step acquires the second information via distinct terminals relating to the information content, and wherein third subsidiary information, being comprised of at least portion of the first subsidiary information and at least a portion of the second subsidiary information is stored in a memory to be held after power down; and a verifying step of verifying whether said first subsidiary information or said second subsidiary information has previously been registered;

wherein said first registration step or said second registration step utilizes, if one of said first subsidiary information or said second subsidiary information has been previously registered, either said first subsidiary information or said second subsidiary information that has previously been registered for registration of the other subsidiary information, wherein functions of the information processing apparatus comprises a function of receiving a television broadcast from a broadcasting station and a function of connecting to Internet through an Internet service provider, wherein upon registration of the second subsidiary information, a list of telephone numbers is presented to a user in an order of increasing trunk code numbers, a first telephone number of the list havina a same trunk code as that of the user's territory;

wherein names of the distinct terminals being closest to where the information procession apparatus is located is first displayed during registration of the first subsidiary information or registration of the second subsidiary information, and wherein correspondence relationships between cities and broadcast territories are stored in a link table.

5. A recording medium having recorded thereon a computer-readable program, said computer-readable program when executed by a computer performs the steps including:

a first acquisition step of acquiring first information;

a first registration step of registering first subsidiary information required for acquiring said first information;

a second acquisition step of acquiring second information;

a second registration step of registering second subsidiary information required for acquiring said second information, wherein the first acquisition step acquires the first information and the second acquisition step acquires the second information via distinct terminals relating to information content, and wherein third subsidiary information being comprised of at least a portion of the subsidiary information and at least a portion of the second subsidiary information is stored in a memory to be held after power down; and a verifying step of verifying whether said first subsidiary information or said second subsidiary information has previously been registered;

wherein said first registration step or said second registration step utilizes, if one of said first subsidiary information or said second subsidiary information is already registered, either the first subsidiary information or the second subsidiary information that has been previously registered for registration of the other subsidiary information, wherein functions of the information processing apparatus comprises a function of receiving a television broadcast from a broadcasting station and a function of connecting to Internet through an Internet service provider, wherein upon registration of the second subsidiaiy information, a list of telephone numbers is presented to a user in an order of increasing trunk code numbers, a first telephone number of the list having a same trunk code as that of the user's territory;

wherein names of the distinct terminals being closest to where the information procession apparatus is located is first displayed during registration of the first subsidiary information or registration of the second subsidiary information, and wherein correspondence relationships between cities and broadcast territories are stored in a link table.

* * * * *

UNITED STATES PATENT AND TRADEMARK OFFICE
CERTIFICATE OF CORRECTION

PATENT NO. : 7,603,686 B2
APPLICATION NO. : 09/996519
DATED : October 13, 2009
INVENTOR(S) : Yotsumoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1349 days.

Signed and Sealed this

Fifth Day of October, 2010

David J. Kappos
*Director of the United States Patent and Trademark Office*